United States Patent [19]

Goffi et al.

[11] Patent Number: 4,715,646
[45] Date of Patent: Dec. 29, 1987

[54] PROTECTIVE COVERING FOR LIGHTWEIGHT VEHICLE

[76] Inventors: Carlo P. Goffi; Deborah E. Clark-Goffi, both of 4972 Suzanne, Pierrefonds, Quebec, Canada, H8X 1Z9

[21] Appl. No.: 20,910
[22] Filed: Mar. 2, 1987
[51] Int. Cl.⁴ .............................................. B60R 9/10
[52] U.S. Cl. .................... 296/136; 150/52 K
[58] Field of Search ............. 296/136, 78 R, 78.1; 280/289 S; 150/52 K, 54 R, 54 A, 54 B; 301/37 R, 37 P; 135/88

[56] References Cited

U.S. PATENT DOCUMENTS

| | | | |
|---|---|---|---|
| 2,243,981 | 6/1941 | Rowan | 296/136 |
| 3,659,872 | 5/1972 | Warner | 280/289 |
| 3,709,519 | 1/1973 | Burrows | 150/52 K |
| 3,884,523 | 5/1975 | Allen | 296/136 |
| 3,968,913 | 7/1976 | Weed et al. | 296/78.1 |
| 4,356,831 | 11/1982 | Adams . | |

Primary Examiner—Robert R. Song
Attorney, Agent, or Firm—Fetherstonhaugh & Co.

[57] ABSTRACT

A protective covering for a lightweight vehicle, such as a bicycle, has covers for the wheels as well as the vehicle to protect from splashing from underneath. The covering has semi circular sheath wheel covers for each wheel having an opening slit to fit over the wheel, each of the covers formed of flexible waterproof sheet material and having wheel cover attachments to hold the cover to the wheel, and an overall cover having a bag like shape with an opening, the overall cover shaped to fit over the vehicle extending down to overlap the wheel covers on the wheels, the overall cover formed of flexible waterproof sheet material and having overall cover attachment to the vehicle.

5 Claims, 6 Drawing Figures

U.S. Patent    Dec. 29, 1987    Sheet 2 of 2    4,715,646
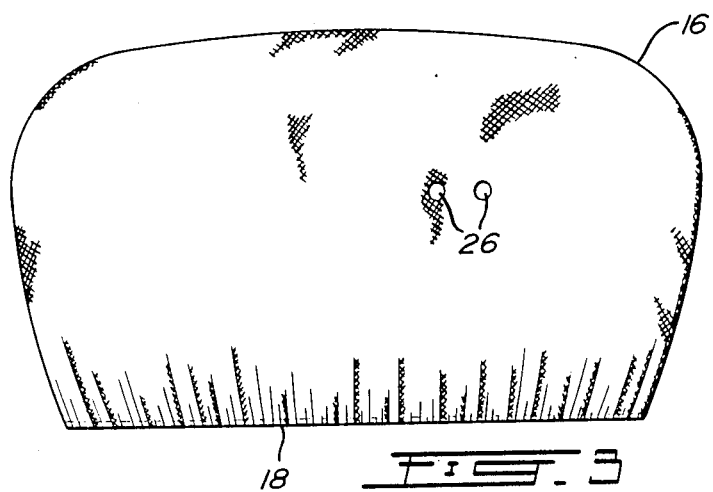
FIG. 3
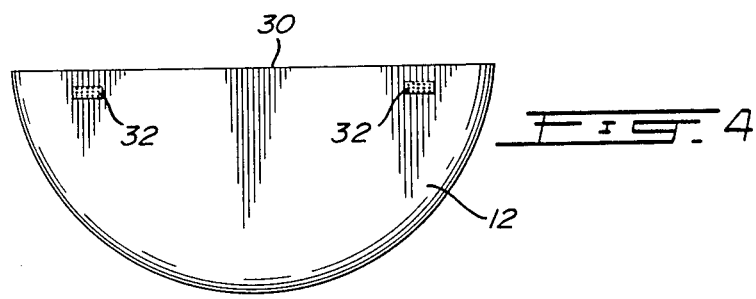
FIG. 4
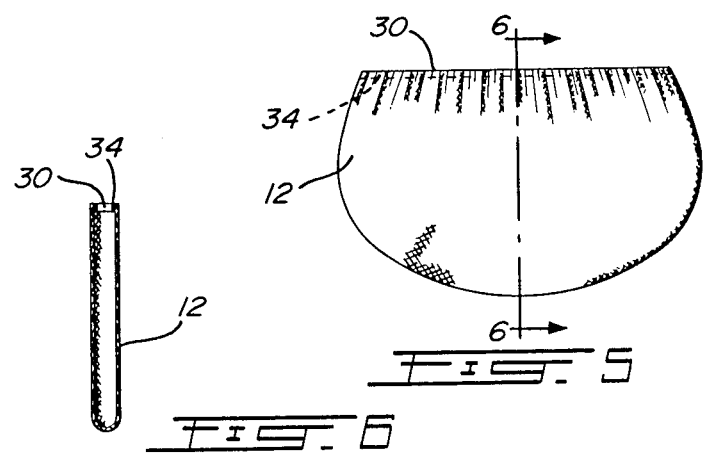
FIG. 5
FIG. 6

PROTECTIVE COVERING FOR LIGHTWEIGHT VEHICLE

The present invention relates to a protective covering that is weather proof and completely protects a lightweight vehicle, such as a bicycle.

Vehicle covers for cars, motorcycles, bicycles and the like are used today to protect vehicles from wind, rain, dust etc. Most covers are not shaped to a specific vehicle, but simply hang over the vehicle and in some cases extend down to the ground. However, no cover known today protects the wheels of the vehicle and this is particularly important in lightweight vehicles such as bicycles where it is important to protect the wheels from splashing, particularly if they are lightweight polished wheels which may be subject to corrosion from salt and the like.

It is an aim of the present invention to provide a protective covering for a lightweight vehicle such as a bicycle which has covers for the wheels as well as for the vehicle itself. Thus the vehicle is protected against splashing from underneath, and in its complete protective covering, may be placed outdoors or in an area which is dusty or otherwise dirty, and still protect the vehicle.

The present invention provides protective covering for a lightweight vehicle having at least two spoked wheels, the covering comprising, semi circular sheath wheel covers for each wheel having an opening slit to fit over the wheel, each of the wheel covers formed of flexible waterproof sheet material, each of the wheel covers having wheel cover attachment means located across the opening slit to attach each of the wheel covers to the wheel at the opening slit and hold each of the wheel covers to the wheel, and an overall cover having a bag like shape with an opening, the overall cover shaped to fit over the vehicle extending down to overlap the wheel covers on the wheels, the overall cover formed of flexible waterproof sheet material, and having overall cover attachment means to the vehicle.

In other embodiments the wheel cover attachment means located across the opening slit of the wheel covers comprises Velcro fastenings and fastens through the spoked wheel. In one embodiment, the overall cover attachment means to hold the overall cover to the vehicle comprises an elastic draw string extending around the opening. The overall cover may have a Velcro fastening across the opening to a assist in holding the overall cover to the bicycle. Holes may be provided strategically located in the overall cover for attachment of a lock to the bicycle.

In drawings which illustrate embodiments of the invention:

FIG. 3 is a side view of of one embodiment of an overall cover of the protective covering;

FIG. 4 is a side view of one embodiment of a semi circular sheath wheel cover;

FIG. 5 is a side view of another embodiment of a semi circular sheath wheel cover;

FIG. 6 is a sectional view through line 6—6 of FIG. 5;

The drawings all illustrate a protective covering for a bicycle. However, the protective covering need not be restricted to a bicycle, but could include a tricycle with spoked wheels or even a four wheel vehicle with spoked wheels provided the vehicle was lightweight allowing for one wheel to be raised for the installation of a wheel cover.

The protective covering is formed of a flexible waterproof sheet material, generally a plastic sheet of polyethylene, nylon, polypropylene or other suitable sheet material. The sheet may be a woven sheet and either colorless or of a specific color if desired. Other suitable flexible waterproof sheet material may be used.

Figure 1:
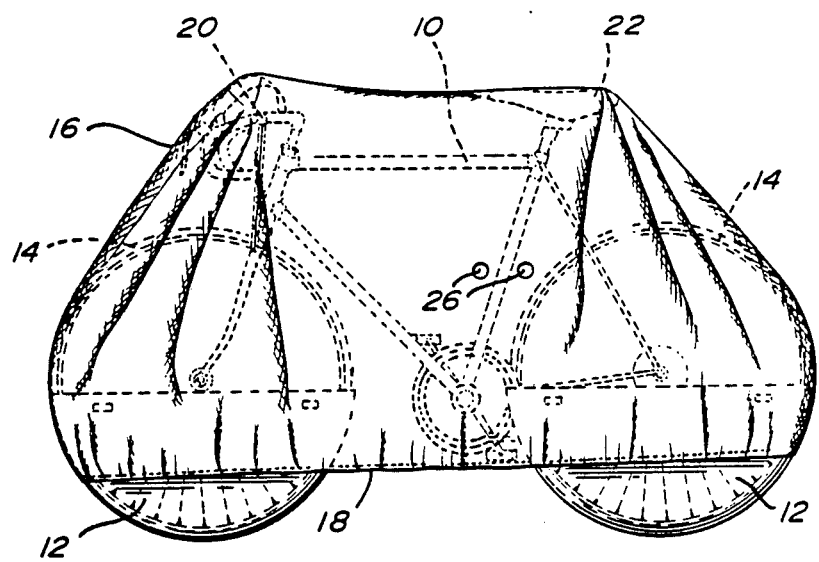
FIG. 1 is an isometric side view showing a bicycle with one embodiment of a protective covering attached.
Figure 2:
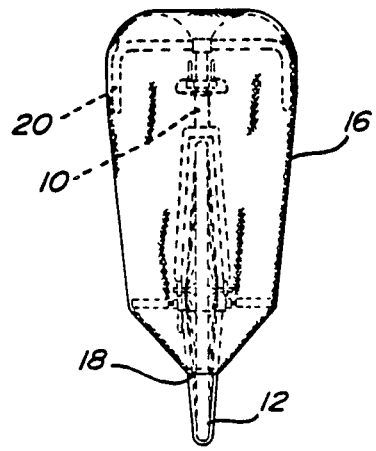
FIG. 2 is an end view of the bicycle shown in FIG. 1 with the protective covering attached.

A bicycle 10 shown in FIGS. 1 and 2 has semi circular sheath wheel covers 12 fitted on the underside of each bicycle wheel 14. An overall cover 16 has a bag shape with an opening 18 which fits over the bicycle 10 and extends down below the wheel covers 12. The overall cover 16 is shaped to fit over the handle bars 20 of the bicycle 10 and over the saddle 22. The overall cover 16 is a substantially loose fit on the vehicle to allow it to be easily placed over the vehicle and also easily removed from the vehicle.

The overall cover 16 as shown in FIG. 3 has an elastic drawstring at its opening 18 so that when it is placed over the bicycle 10, the elastic drawstring contracts to hold the overall cover 16 to the vehicle. Two holes 26 are positioned at a strategic location on both sides of the overall cover 16 so that a bicycle lock can be inserted through the holes to lock the bicycle frame to a suitable firm support.

The semi circular sheath wheel cover for each wheel is illustrated in FIG. 4. The wheel cover 12 has an opening slit 30 at the top for fitting over a wheel. Two Velcro fastenings 32 are provided on each side of the wheel cover 12 facing inwards so that they may be joined together through the spokes of a wheel 14. Thus the Velcro tabs 32 hold the wheel cover 12 to the wheel.

FIGS. 5 and 6 shows another embodiment of a semi circular sheath wheel cover 12 with an elastic drawstring 34 at the opening slit 30. As can be seen the wheel cover 12 is arranged to be somewhat shallower than the radius of a wheel so that the drawstring 34 contracts and holds the wheel. cover 12 at a position below the axis of the wheel .

Various changes may be made to the embodiments shown herein without departing from the scope of the present invention which is limited only by the following claims.

The embodiments of an invention in which an exclusive property or privilege is claimed are defined as follows:

1. Protective covering for a lightweight vehicle having at least two spoked wheels, the covering comprising:

semi circular sheath wheel covers for each wheel having an opening slit to fit over the wheel, each of the wheel covers formed of flexible waterproof sheet material, each of the wheel covers having wheel cover attachment means located across the opening slit to attach each of the wheel covers to the wheel at the opening slit and hold each of the wheel covers to the wheel, and an overall cover having a bag like shape with an opening, the overall cover shaped to fit over the vehicle extending down to overlap the wheel covers on the wheels, the overall cover formed of flexible waterproof sheet material, and having overall cover attachment means to the vehicle.

2. The protective covering according to claim 1 wherein the wheel cover attachment means located across the opening slit of the wheel covers comprises Velcro fastenings and fastens through the spoked wheel.

3. The protective covering according to claim 1 wherein the overall cover attachment means to hold the overall cover to the vehicle comprises an elastic drawstring extending around the opening.

4. The protective covering according to claim 1 including holes strategically located in the overall cover for attachment of a lock to the bicycle.

5. The protective covering according to claim 1 wherein the wheel cover attachment means located across the opening slit to attach the wheel covers to the wheels, comprises an elastic drawstring along the periphery of the opening slit.

* * * * *